Patented Jan. 31, 1950

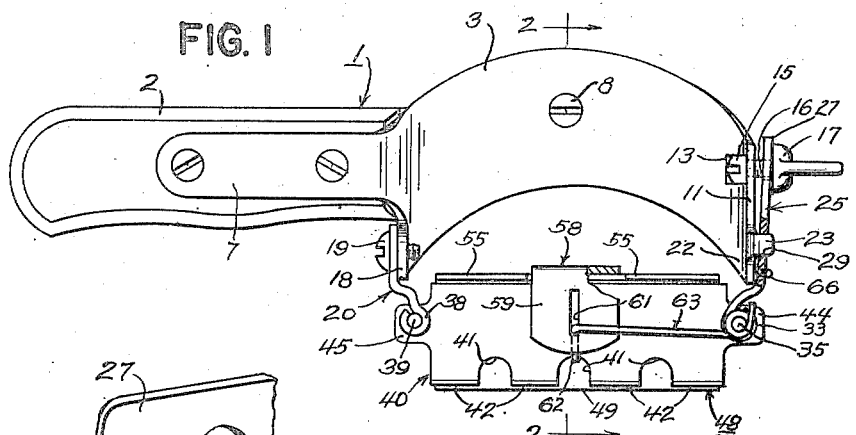

2,495,989

UNITED STATES PATENT OFFICE 2,495,989

MEAT TENDERIZER

Stephen A. Slauson, Cedar Rapids, Iowa, assignor to National Stamping & Plating Corporation, Cedar Rapids, Iowa, a corporation of Iowa Application January 2, 1946, Serial No. 638,683

5 Claims. (Cl. 17—30)

1

The present invention relates generally to meat tenderizers and more particularly to manually operated or mace-like devices used for dicing, tenderizing and amalgamating the poorer cuts of meat into palatable steaks and the like.

The principal object of this invention is the provision of a hand operated meat tenderizer having very efficient cutting knives which may be easily removed, for sharpening, replacing or the like, and a further object of this invention is the provision of a device of this kind which is sanitary to use, easily cleaned, and easily disassembled for cleaning. More particularly, it is an important feature of this invention to provide a hand operated meat tenderizer having an improved knife supporting structure which is provided with means for keeping the knives pulled tight in the frame, and a further feature is the provision of an open frame which leaves no place for particles of meat to accumulate.

An additional object of this invention is the provision of an improved meat tenderizer having a plurality of cutting blades interspaced with a plurality of separately and independently mounted ejectors which are spring biased and self-cleaning.

Other and further features and objects of the invention will be more apparent to those skilled in the art upon a consideration of the accompanying drawings and following specification, wherein is disclosed a single exemplary embodiment of the invention, with the understanding, however, that such changes may be made therein as fall within the scope of the appended claims, without departing from the spirit of the invention.

In the drawings:

Figure 1 is a side view of a meat tenderizer in which the principles of the present invention have been incorporated.

Figure 2 is a sectional view taken generally along the line 2—2 of Figure 1.

Figure 3 is a perspective view of one of the ejectors and

Figure 4 is a partial perspective view of one of the knife supports.

Referring now more particularly to Figure 1 in which the reference numeral 1 indicates the frame of the device; this frame 1 is comprised of a handle 2 which is shaped so that it easily fits the hand, and a pair of frame bars 3 and 4, constructed right and left hand. Each frame bar 3 and 4 has a rear extension 7 which sets in a recess formed in the handle 2 to receive it, the frame bars being curved so as to offset the

2 extensions 7 and space them apart so as to receive the handle therebetween. The central portions of the frame bars 3 and 4 are disposed in contact with each other and are apertured to receive a connecting bolt 8, which bolt holds the frame bars rigidly together. At the end opposite the extension 7, each bar is formed to extend laterally outwardly, as indicated at 11 and 12. At the points where the frame bars 3 and 4 curve so as to form the lateral extensions, each bar is slotted, as at 13 and 14, to provide a socket to receive the flattened head 15 of a clamping and adjusting bolt 16. The latter is provided with a wing nut 17. The frame bars 3 and 4 are formed with rear lateral extensions 18, one at each side of the device, each of which is apertured and tapped to receive a screw 19 by which a transverse rear knife holder 20 is firmly affixed to the frame 1. The lateral extensions 11 and 12 formed on the foreward ends of the frame members 3 and 4 terminate in forwardly turned lugs 23 and 24 which receive and support a pivoted front knife holder 25.

As best shown in Figure 4, the front knife holder has an upwardly extending tongue 27 which is apertured, as at 28, to receive the adjusting bolt 16. This tongue is also provided with a pair of openings 29 to receive the lugs 23 and 24. The lower part of the foreward knife holder 25 is bent along its lower edge to form a roll or bead 33 to receive the knife pin 35, this bead being cut or slit at a plurality of points, as shown at 34 (Figure 4), to thus provide knife receiving slots. The knife pin 35, as best shown in Figure 2, extends laterally beyond the frame 1 and the edges of the front knife holder, one end of the pin 35 having a head 37. The rear knife holder 20 has a similar roll or bead 38 along its lower edge which receives a knife pin 39 and which is also slotted to receive the knives.

A plurality of knives 40 are carried on the pins 35 and 39. Each knife, as best shown in Figure 1, is made as a rectangular part, notched along its lower edge, as at 41, to provide a plurality of relatively short separated cutting edges 42. Also, each knife has an apertured extension at each end, as shown at 44 and 45, the apertures permitting the mounting of the knives 40 on the pins 35 and 39, as shown at Figure 1, the knife ends 44 and 45 being received in the slots 34 of the front knife holder 25 and in the similar slots in the rear knife holder 20. As will be seen from Figure 1, whenever the nut 17 is tightened, the front knife holder 25 acts as a lever and urges the pin 35 outwardly, thus placing all of the knives or blades 40 in tension.

Between each knife and the adjacent knife is an ejector 48. As best shown in Figure 3, each ejector comprises a U-shaped member having a lower ejecting face 49 and two side-wall portions 51 and 52, these side walls being of equal height at the central portion thereof as shown at 53 and 54, the wall 51 further being provided with a pair of outwardly extending flanges 55 adjacent the ends thereof. The several ejectors are disposed loosely between the associated knives but are biased for downward movement relative thereto so that normally the faces 49 lie immediately below the cutting edges of the knives 40, as shown in Figures 1 and 2. The apertures 50 in the side walls of ejectors aid in self cleaning of ejectors.

A yoke 58 overlies the several knives and ejectors, contacting the upper edges 53 and 54 of the ejectors and the upper edges of the knives, the yoke 58 having its ends 59 downturned and slotted, as at 61, to receive the ends 62 of biasing springs 63. As best shown in Figure 2, the ends 62 of the springs are each offset laterally inwardly so as to extend into and interlock in the slots 61. Each spring 63 has a coiled section 64 spaced from the end 62, the said coiled section being disposed about and carried on the associated end of the knife pin 35. Beyond the coiled section 64, each spring 63 has its end 66 shaped to hook into an opening 67 in the front knife holder 25. The springs 63 are tensioned to urge the yoke 58 downwardly but yield upwardly in use.

The knives and ejectors are readily removed merely by loosening the wing nut 17, thus relieving the tension on the blades. The pin 35 may then be readily pulled out, releasing the springs and permitting the detachment of the yoke 58 and the removal of the ejectors and knives.

Although I have described a specific embodiment of my invention, it is apparent that modifications thereof may be made by those skilled in the art. Such modifications may be made without departing from the spirit and scope of my invention as set forth in the appended claims.

What I claim is:

1. A meat tenderizer comprising a plurality of blades spaced apart laterally, a plurality of ejectors between said blades, each of said ejectors having a notch at one side, and a biased member extending across said blades and seated in the notches of said ejectors.

2. In a meat tenderizer, a plurality of spaced blades, a plurality of channel-shaped ejectors positioned therebetween, and means for biasing said ejectors downwardly between said blades, the said ejectors having apertures in the side walls thereof extending longitudinally adjacent the lower portions thereof, whereby meat particles may fall through said openings and out of the said channel-shaped ejectors.

3. A meat tenderizer comprising a main frame, a looped part on one end of said frame and fixed thereto, a pin loosely disposed in said looped part, a second looped part movably connected with the other end of said frame, a pin loosely disposed in said second looped part, a plurality of blades, each having apertured ends, carried on said pins, means for adjusting said second part on said frame so as to tighten said blades and hold said pins in said looped parts, either or both of said pins being removable when said second part is loosened, ejectors movably mounted between said blades, and spring means mounted on one of said pins and resiliently holding said ejectors in position between said blades.

4. A meat tenderizer comprising a main frame, a looped part on one end of said frame and fixed thereto, a pin loosely disposed in said looped part, a second looped part movably connected with the other end of said frame, a pin loosely disposed in said second looped part, a plurality of blades, each having apertured ends, carried on said pins, means for adjusting said second part on said frame so as to tighten said blades and hold said pins in said looped parts, either or both of said pins being removable when said second part is loosened, ejectors movably mounted between said blades, and spring means urging said ejectors downwardly into ejecting position between the blades.

5. In a meat tenderizer, a handle, a plurality of spaced blades, means adjacent the ends thereof detachably securing said blades to said handle, a plurality of channel-shaped ejectors disposed between the blades, each ejector having a laterally extending flange portion thereof adapted to overlie the top edge of an adjacent blade to limit downward movement of said ejector, and spring-biased means in engagement with the ejectors and urging them downwardly, the side-wall portions of the ejectors having longitudinally extending slots disposed adjacent the lower portions thereof to permit discharge of meat particles therethrough from between the said blades and ejectors.

STEPHEN A. SLAUSON.

REFERENCES CITED

The following references are of record in the file of this patent:

UNITED STATES PATENTS

| Number | Name | Date |
|---|---|---|
| 437,517 | Severance | Sept. 30, 1890 |
| 456,670 | Fugate | July 28, 1891 |
| 764,374 | Remsen | July 5, 1904 |
| 1,027,020 | Waters | May 21, 1912 |
| 1,237,162 | Brazeau | Aug. 14, 1917 |
| 1,421,458 | Gregory | July 4, 1922 |
| 2,109,434 | Oliver | Feb. 22, 1938 |